United States Patent Office 3,413,381
Patented Nov. 26, 1968

3,413,381
ALPHA-SUBSTITUTED PHOSPHATYL OR THIO-PHOSPHATYL HALOKETONE, KETAL OR THIO-KETAL DERIVATIVES THEREOF
Henryk A. Cyba, Evanston, Ill., assignor to Universal Oil Products Company, Des Plaines, Ill., a corporation of Delaware
No Drawing. Continuation-in-part of application Ser. No. 238,773, Nov. 19, 1962. This application June 13, 1966, Ser. No. 556,885
6 Claims. (Cl. 260—929)

ABSTRACT OF THE DISCLOSURE

Alpha-substituted phosphatyl and thiophosphatyl haloketones and ketal and thioketal derivatives thereof having the structures hereinafter given and suitable for use as insecticides.

---

This application is a continuation-in-part of my copending application Ser. No. 238,773, filed Nov. 19, 1962, now Patent No. 3,263,000, July 26, 1966, and relates to a novel composition of matter and to the use thereof as an insecticide.

In my parent application I have described novel compositions of matter, including those containing hydrogen or halogen in specific positions of the molecule. The claims in the parent application are directed to those compounds having hydrogen in these particular positions, and the present application is directed to compounds having halogen replacing one or more of the hydrogens referred to above.

The halogen-containing compounds of the present application offer even further advantages for these novel compounds. These halogen-containing compounds possess improved insecticidal properties. In addition, the halogen-containing compounds offer advantages for use as E.P. (extreme pressure) additives.

The novel composition of matter of the present application is selected from the group consisting of alpha-substituted phosphatyl haloketone, and ketal and thioketal derivatives thereof.

The alpha-substituted phosphatyl haloketone is represented by the following formula:

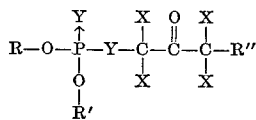

where O is oxygen, P is phosphorus, C is carbon, X is halogen or hydrogen, at least one X being halogen, Y is sulfur or oxygen, R is hydrogen or hydrocarbon, and R'' is hydrogen, hydrocarbon, halogen or

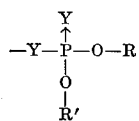

The ketal and thioketal derivatives of the alpha-substituted phosphatyl haloketone are represented by the following formula:

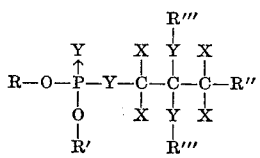

where O, P, C, X, Y, R, R' and R'' have the same connotations as hereinbefore set forth, and R''' is hydrogen or hydrocarbon.

Where R, R', R'' and/or R''' in the above formulas are hydrocarbon, they preferably are alkyl groups. More particularly R and R' are alkyl groups of from 1 and more particularly of from 3 to 20 carbon atoms each, and R'' and R''' are alkyl groups of from 1 to 6 and still more particularly from 1 to 4 carbon atoms. Other hydrocarbon groups included in the present invention are cycloalkyl and more particularly cyclopentyl and cyclohexyl, alkaryl and more particularly alkylphenyl and alkylnaphthyl in which the alkyl group contains from 1 to 20 carbon atoms, aryl and more particularly phenyl and naphthyl, aralkyl and more particularly phenylalkyl and naphthylalkyl in which the alkyl contains from 1 to 20 and still more particularly from 1 to 6 carbon atoms, alkylcycloalkyl and cycloalkylalkyl in which the alkyl contains from 1 to 20 carbon atoms, etc. It is understood that these groups, in turn, may contain nonhydrocarbon substituents attached thereto and particularly substituents containing halogen, particularly chlorine and/or bromine, sulfur, oxygen, nitrogen, phosphorus, or mixtures thereof.

Referring to the first formula above set forth, in one preferred embodiment of the invention R and R' are alkyl groups of from 1 to 20 and more preferably from 3 to 15 carbon atoms, 2 of the X are halogen and 2 of the X are hydrogen, and R'' is hydrogen or an alkyl group of from 1 to 6 carbon atoms, or R'' is a phosphatyl or dithiophosphatyl group and more particularly the same as the other phosphatyl or dithiophosphatyl group.

Referring to the last formula above set forth, in one preferred embodiment of the invention R and R' are alkyl groups of from 1 to 20 and preferably from 3 to 15 carbon atoms, at least one X is chlorine, Y is sulfur and R'' is an alkyl group of from 1 to 6 carbon atoms or R'' is a phosphatyl or dithiophosphatyl group and more particularly the same as the other phosphatyl or dithiophosphatyl group, and R''' is an alkyl group of from 1 to 6 carbon atoms.

The novel compounds of the present invention are readily prepared by the reaction of an alkali metal thiophosphate or dithiophosphate and an alpha-polyhaloketone in the presence of an oxygen-containing polar solvent. It is essential that the reaction is effected in the presence of the polar solvent in order to form the novel compounds of the present invention by the interaction of the alkali metal component of the phosphate or dithiophosphate with one of the halogen components of the polyhaloketone. When using a nonpolar solvent, entirely different reaction products may be obtained.

It is also essential that the polyhaloketone used in preparing the novel composition of the present invention is an alpha-polyhaloketone. In other words, at least one halogen should be positioned on the carbon atom adjacent to the keto group.

In a preferred embodiment the alpha-polyhaloketone is an alpha-polychloroketone. Preferred alpha-polychloroketones include dichloroketone, trichloroketone, tetrachloro ketone, pentachloroketone, hexachloroketone, etc. While the polychloroketones are preferred, it is understood that the corresponding polybromoketones, polyiodoketones and polyfluoroketones may be used or mixed halo-substituted ketones containing chlorine and fluorine or bromine and fluorine.

Preferred alpha-polychloroketones are 1,3-dichloroacetone, 1,1,3,3-tetrachloroacetone and hexachloroacetone or 1,1,3,3-tetrafluoro-1,3-dichloroacetone-1,1,3,3,3 - pentafluorochloroacetone, etc. Other polychloroketones include 1,3 - dichlorobutanone-2, 1,4 - dichlorobutanone-2, 1,3-dichloropentanone-2, 1,4-dichloropentanone-2, 1,5-dichloropentanone-2, 1,3-dichlorohexanone-2, 1,4-dichlorohexanone-2, 1,5 - dichlorohexanone-2, 1,6 - dichlorohexanone-2, etc. Specially preferred polychloroketones for use when the novel composition of matter is used as an insecticide comprise 1,1-dichloroacetone, 1,1,3-trichloroacetone, 1,1,3,3-tetrachloroacetone, 1,1,1,3,3-pentachloroacetone, 1,1,1,3,3,3 - hexachloroacetone, 1,1,3-trichlorobutanone-2 1,1,3,3-tetrachlorobutanone-2, 1,1,4-trichlorobutanone-2, 1,1,4,4-tetrachlorobutanone-2, 1,3,4-trichlorobutanone-2, 1,1,3,4-tetrachlorobutanone-2, 1,1,3,4,4-pentachlorobutanone-2, 1,1,1,3,3,4,4,4-octachlorobutanone-2, 1,1,3 - trichloropentanone - 2, 1,1,3,3 - tetrachloropentanone-2, 1,1,4-trichloropentanone-2, 1,1,4,4-tetrachloropentanone-2, 1,1,5 - trichloropentanone-2, 1,1,5,5 - tetrachloropentanone-2, 1,3,4,5-tetrachloropentanone-2, 1,1,-3,4,5 - pentachloropentanone-2, 1,1,1,3,3,4,4,5,5,5 - decachloropentanone-2, 1,1 - dichlorohexanone-2, 1,1,3 - trichlorohexanone-2, 1,1,3,3-tetrachlorohexanone-2, 1,1,4-trichlorohexanone-2, 1,1,4,4-tetrachlorohexanone-2, 1,1,5-trichlorohexanone-2, 1,1,5,5-tetrachlorohexanone-2, 1,1,6-trichlorohexanone-2, 1,1,6,6-tetrachlorohexanone-2, 1,3,-4,5-tetrachlorohexanone-2, 1,1,5,6-tetrachlorohexanone-2, etc.

For economic reasons, sodium or potassium is preferred as the alkali metal component, although it is understood that lithium, calcium, magnesium, zinc, cadmium, barium, nickel, copper, etc., may be used. The reaction is readily effected by refluxing the alkali metal salt of the phosphate or dithiophosphate and the polyhaloketone in the presence of the oxygen-containing polar solvent.

When the polyhaloketone is reacted with sodium or potassium dithiophosphoric acid, R and R' in the first formula above set forth are hydrogen and the resultant compounds include dithiophosphatyl haloacetone [which also may be named S-(halopropyl-2-one) dithiophosphate], dithiophosphatyl halobutanone - 2, dithiophosphatyl halopentanone-2, dithiophosphatyl halohexanone-2, etc. In a preferred embodiment the dithiophosphatyl component contains 1 or 2 alkyl groups, each containing from about 1 to about 20 and more preferably from 1 to 6 carbon atoms. Illustrative compounds formed by the reaction of polychloroketones with such dialkyl dithiophosphates include O,O-dimethyl-dithiophosphatyl-1,3-dichloroacetone which also may be named O,O-dimethyl-S-1,3-dichloropropyl-2-one-dithiophosphate, O,O-diethyl-dithiophosphatyl-dichloroacetone, O,O-dimethyl-dithiophosphatyl-dichlorobutanone-2, O,O-diethyldithiophosphatyl-dichlorobutanone-2, O,O-dimethyl-dithiophosphatyl-dichloropentanone-2, O,O-diethyl-dithiophosphatyl-dichloropentanone-2, O,O - dimethyl-dithiophosphatyl-dichlorohexanone-2, O,O-diethyl-dithiophosphatyl-dichlorohexanone-2, etc.

When used as an E.P. additive in lubricating oil, higher alkyl derivatives are preferred such as O,O-dipropyl-dithiophosphatyl-dichloroacetone, O,O-dibutyl-dithiophosphatyl dichloroacetone, O,O-dipentyl-dithiophosphatyl dichloroacetone, O,O-dihexyldithiophosphatyl dichloroacetone, O,O-diheptyl-dithiophosphatyl dichloroacetone, O,O-dioctyl-dithiophosphatyl dichloroacetone, O,O-dinonyl-dithiophosphatyl dichloroacetone, O,O-didecyl-dithiophosphatyl dichloroacetone, O,O-diundecyl-dithiophosphatyl dichloroacetone, O,O-didodecyl-dithiophosphatyl dichloroacetone, O,O-ditridecyl-dithiophosphatyl dichloroacetone, O,O-ditetradecyl-dithiophosphatyl dichloroacetone, O,O-dipentadecyl-dithiophosphatyl dichloroacetone, O,O-dihexadecyl - dithiophosphatyl dichloroacetone, O,O-diheptadecyl-dithiophosphatyl dichloroacetone, O,O-dioctadecyl-dithiophosphatyl dichloroacetone, O,O-dinonadecyl-dithiophosphatyl dichloroacetone, O,O - dieicosyl-dithiophosphatyl dichloroacetone, etc., and similarly substituted dialkyl dithiophosphatyl butanone-2, pentanone-2, hexanone-2, etc. Generally the alkyl groups are the same as in the compounds specifically set forth above, although it is understood that different alkyl groups may be used as illustrated, for example, in compounds as O-methyl-O-ethyl-dithiophosphatyl dichloroacetone, O-ethyl-O-propyl-dithiophosphatyl dichloroacetone, O-propyl-O-amyl-dithiophosphatyl dichloroacetone, O-ispropyl-O-decyl-dithiophosphatyl dichloroacetone, O-isopropyl-O-tridecyl-dithiophosphatyl dichloroacetone, O-isopropyl-O-pentadecyl-dithiophosphatyl dichloroacetone, O-sec-butyl-O-octyl-dithiophosphatyl dichloroacetone, O-sec-butyl-O-decyl-dithiophosphatyl dichloroacetone, O-sec-butyl-O-tridecyldithiophosphatyl dichloroacetone, O-sec-amyl-O-octyl-dithiophosphatyl dichloroacetone, O-sec-amyl-O-decyl-dithiophosphatyl dichloroacetone, O-sec-amyl-O-tridecyl-dithiophosphatyl dichloroacetone, etc.

The above specific compounds are examples of products in which Y in the first formula is sulfur. When Y in the first formula is oxygen or oxygen and sulfur, the novel compounds will be analogous to those hereinbefore set forth and will be prepared by the reaction of sodium or potassium phosphoric acid or monothiophosphoric acid or sodium or potassium dialkyl phosphoric acid or dialkyl monothiophosphoric acid with the polyhaloketone. In the interest of simplicity, specific compounds prepared in this manner are not being enumerated because these are readily determinable from the corresponding dithiophosphatyl compounds.

In the compounds set forth above, the product is prepared by the reaction of equal mole proportions of the phosphate and the polyhaloketone. When the dithiophosphate or phosphate is reacted in a proportion of 2 moles thereof to one mole proportion of a polychloroacetone containing at least 3 chlorine atoms, R" in the first formula above set forth is a dithiophosphatyl or phosphatyl group. Illustrative dithiophosphatyl compounds in this embodiment include 1,3-bis-(O,O-dimethyl-dithiophosphatyl) chloroacetone, 1,3-bis-(O,O-diethyl-dithiophosphatyl) chloroacetone, 1,3-bis-(O,O-dipropyl-dithiophosphatyl) chloroacetone, 1,3-bis-(O,O-dibutyl-dithiophosphatyl) chloroacetone, 1,3-bis-(O,O-dipentyl-dithiophosphatyl) chloroacetone, 1,3-bis(O,O-dihexyl-dithiophosphatyl) chloroacetone, 1,3-bis-(O,O-diheptyl-dithiophosphatyl) chloroacetone, 1,3-bis-(O,O-dioctyl-dithiophosphatyl) chloroacetone, 1,3-bis-(O,O-dinonyl-dithiophosphatyl) chloroacetone, 1,3-bis-(O,O-didecyl-dithiophosphatyl) chloroacetone, 1,3-bis-(O,O-diundecyl-dithiophosphatyl) chloroacetone, 1,3-bis-(O,O-didodecyl-dithiophosphatyl) chloroacetone, 1,3-bis-(O,O-ditridecyl-dithiophosphatyl) chloroacetone, etc., and the corresponding bis-(dialkyl-dithiophosphatyl) chlorobutanone-2, chloropentanone-2, chlorohexanone-2, etc. Similarly, when a phosphate is used instead of the dithiophosphate, the corresponding phosphatyl compounds will be prepared. It is understood that when a tetrachloroacetone is used the product will contain 2 chlorine atoms and when hexachloroacetone is used the product will contain 4 chlorine atoms.

The specific compounds hereinbefore set forth comprise those in which the dithiophosphate or phosphate contains 2 alkyl groups. It is understood that the corresponding dithiophosphatyl or phosphatyl compounds containing only one alkyl group attached to the phosphorus may be employed, in which embodiment the alkyl groups is selected from those hereinbefore specifically set forth. Mixtures of the mono- and dialkyl phosphates are available commercially and conveniently are used in accordance with the present invention.

As hereinbefore set forth, these compounds are of advantage for use as insecticides, pesticides, herbicides, rodenticides, etc., and at least one X is a halogen and preferably chlorine. Additional illustrative compounds include dialkyl dithiophosphatyl-1-chloroacetone [which also may be named O,O-dialkyl-S-(1-chloropropyl-2-one) dithiophosphate], dialkyldithiophosphatyl-1,1-dichloroacetone, dialkyl-dithiophosphatyl-3-chloroacetone, dialkyl-dithiophosphatyl-1,3-dichloroacetone, dialkyl-dithiophosphatyl-1,1,3,3,3 - pentachloroacetone, dialkyl-dithiophosphatyl-1-chlorobutanone-2, dialkyl-dithiophosphatyl-1,1- dichlorobutanone-2, dialkyl-dithiophosphatyl-1,3-dichlorobutanone - 2, dialkyl - dithiophosphatyl - 1,4 - dichlorobutanone-2, dialkyl-dithiophosphatyl-1-chloropentanone-2, dialkyl-dithiophosphatyl-1,1-dichloropentanone-2, dialkyl-dithiophosphatyl-1-chlorohexanone-2, dialkyl-dithiophosphatyl-1,1-dichlorohexanone-2, etc., 1,3-bis-(O,O-dialkyl-dithiophosphatyl)-1-chloroacetone, 1,3-bis-(O,O-dialkyl-dithiophosphatyl)-1,1-dichloroacetone, 1,3-bis-(O,O-dialkyl-dithiophosphatyl)-1,1,3,3-tetrachloroacetone, 1,3-bis-(O,O-dialkyl-dithiophosphatyl)-1-chlorobutanone-2, 1,3-bis - (O,O - dialkyl - dithiophosphatyl) - 1,1 - dichlorobutanone-2, 1,3 - bis - (O,O-dialkyl-dithiophosphatyl)-1-chloropentanone-2, 1,3 - bis - (O,O-dialkyl-dithiophosphatyl)-1,1-dichloropentanone-2, 1,3-bis-(O,O-dialkyl-dithiophosphatyl)-1-chlorohexanone-2, 1,3-bis-(O,O-dialkyl-dithiophosphatyl)-1,1-dichlorohexanone-2, etc., in which the alkyl groups contain from 1 to 20 carbon atoms each. Here again it is understood that the corresponding di-alkylphosphatyl compounds are included in the present invention.

The alpha substituted dithiophosphatyl or phosphatyl ketones are prepared in any suitable manner and are readily prepared by the reaction of an alkali metal dithiophosphate or alkali metal phosphate with the polyhaloketone. As hereinbefore set forth, when R″ in the above formulas is hydrogen or an alkyl group, the dithiophosphate and polyhaloketone are reacted in equal molar proportions. When R″ in the above formulas is a dithiophosphatyl or phosphatyl group, 2 mole proportions of the dithiophosphate or phosphate are reacted per 1 mole proportion of the polyhaloketone. The reaction is readily effected by refluxing the reactants for a time sufficient to accomplish the desired reaction. This may range from 0.5 to 48 hours or more and generally will be for a time of from about 3 to about 20 hours. The refluxing temperature generally will be within the range of from about 30° to about 150° C. and preferably about 50° to about 100° C. The pressure may range from atmospheric to 1000 p.s.i.g. or more.

As hereinbefore set forth, it is essential that the reaction is effected in the presence of a polar solvent. Any suitable oxygen-containing polar solvent is employed including alcohols, particularly methanol, ethanol, propanol, butanol, etc., ketones including acetone, methyl ethyl ketone, diethyl ketone, dipropyl ketone, etc., and glycols, glycolethers, alkylamides, dimethylformamide, dimethylacetamide, nitromethane, dimethyl or diethyl sulfoxide, dimethyl ether, diethyl ether, etc., water or aqueous solutions of the solvents hereinbefore set forth. When desired, either or both of the reactants may be prepared as a solution in the solvent for ease of handling or in forming a more fluid reaction mixture, or the solvent may be added to the reaction mixture. The solvent permits effecting the reaction at lower temperature and thereby favors the formation of monomers. Polymers are formed at the higher temperatures. The polymers or polycondensates are not harmful in lubricating oils, but are undesirable in pesticidal and insecticidal formulations.

In one method of operation the polyhaloketone and alkali metal dialkyldithiophosphate or dialkylphosphate are formed as separate solutions in an alcoholic solvent. The solutions then are mixed, and the mixture is heated and maintained at refluxing conditions for the desired time. Following the completion of the reaction, the desired product is recovered in any suitable manner. In one method the product is dissolved in an aromatic solvent, washed with water and/or sodium bicarbonate or similar solution, dried over anhydrous sodium sulfate, anhydrous potassium carbonate or the like, and then filtered and heated to remove the aromatic solvent, the latter generally being effected under vacuum.

As hereinbefore set forth, another embodiment of the invention comprises the ketal and thioketal derivatives of the alpha-substituted dithiophosphatyl or phosphatyl ketone as illustrated by the last formula hereinbefore set forth. These derivatives may be prepared in any suitable manner and preferably by reacting the desired alcohol or mercaptan with the alpha-substituted dithiophosphatyl or phosphatyl haloketone in the presence of an acid catalyst. Any suitable acid catalyst may be used, hydrogen chloride being particularly preferred. In one embodiment the alcohol or mercaptan is used in a proportion of 2 moles thereof to 1 mole of the dithiophosphatyl or phosphatyl haloketone and in another embodiment the alcohol or mercaptan is used in equal mole proportions to the dithiophosphatyl or phosphatyl haloketone. The reaction readily occurs at ambient temperature by commingling the reactants, preferably with stiring, in order to obtain intimate mixing. Usually a slight excess of the alcohol or mercaptan is employed. Following completion of the reaction, the product is dried in any suitable manner, including the use of anhydrous sodium sulfate, anhydrous potassium carbonate, etc., and then filtered and distilled, preferably under vacuum, to remove lighter materials.

Any suitable alcohol is used, including methyl alcohol, ethyl alcohol, propyl alcohol, butyl alcohol, pentyl alcohol, hexyl alcohol, heptyl alcohol, octyl alcohol, nonyl alcohol, decyl alcohol, undecyl alcohol, dodecyl alcohol, etc. Similarly, any suitable mercaptan is used including methyl mercaptan, ethyl mercaptan, propyl mercaptan, butyl mercaptan, pentyl mercaptan, hexyl mercaptan, etc., benzylmercaptan, thiophenol or thiophenol derivatives as chlorothiophenol, para-nitrothiophenol, ortho-nitrothiophenol, 2-chloroethyl-mercaptan, 2-alkoxymercaptan and, in general, mercaptans containing such substitutes as Cl, OH, RO—, $NO_2$, etc.

Illustrative examples of the thioketal derivatives include dialkyl-dithiophosphatyl - 1,3 - dichloro-2,2-dimethyl-mercaptopropane, dialkyl-dithiophosphatyl - 1,3 - dichloro-2,2-diethylmercaptopropane, dialkyl - dithiophosphatyl-1,3-dichloro-2,2-di-propylmercaptopropane, dialkyl-dithiophosphatyl-1,3-dichloro - 2,2 - di-butylmercaptopropane, dialkyl-dithiophosphatyl - 1,3 - dichloro - 2,2-dipenthylmercaptopropane, dialkyl-dithiophosphatyl - 1,3-dichloro-2,2 - di-hexylmercaptopropane, etc., dialkyl-dithiophosphatyl - 1,4 - dichloro - 2,2 - di-methylmercapto-butane, dialkyl-dithiophosphatyl - 1,4 - dichloro - 2,2 - di-ethylmercaptobutane, dialkyl-dithiophosphatyl - 1,4 - dichloro-2,2 - di-butylmercaptobutane, dialkyl-dithiophosphatyl-1, 4-dichloro - 2,2 - di - pentylmercaptobutane, dialkyl-dithiophosphatyl - 1,4 - dichloro - 2,2-di-hexylmercaptobutane, etc., dialkyl - dithio - phosphatyl - 1,5 - dichloro - 2,2 - di-methylmercaptopentane, dialkyl - dithiophosphatyl - 1,5-dichloro - 2,2 - di- ethylmercaptopentane, dialkyl-dithio-phosphatyl - 1,5 - dichloro - 2,2 - di-propylmercaptopentane, dialkyl-dithiophosphatyl - 1,5 - dichloro - 2,2 - di-butyl-mercaptopentane, dialkyl-dithiophosphatyl - 1,5-dichloro - 2,2 - di-pentylmercaptopentane, dialkyl-di-thiophosphatyl - 1,5 - dichloro - 2,2 - di-hexylmercaptopentane, etc., dialkyl-dithio-phosphatyl - 1,6 - dichloro - 2,2-di-methylmercaptohexane, dialkyl-dithiophosphatyl - 1,6-dichloro - 2,2 - di-ethylmercaptohexane, dialkyl-dithiophosphatyl - 1,6 - dichloro - 2,2 - di-propylmercaptohexane, dialkyl-dithiophosphatyl - 1,6 - dichloro - 2,2 - di-butyl-mercaptohexane, dialkyl-dithiophosphatyl - 1,6 - dichloro - 2,2 - di-pentylmercaptohexane, dialkyl-dithiophosphatyl - 1,6 - dichloro - 2,2 - di-hexylmercaptohexane, etc., dialkyl-dithiophosphatyl - 1 - chloro - 2,2 - dimethylmercaptopropane, dialkyl-dithiophosphatyl - 2,2 - dimethylmercapto - 3 - chloropropane, dialkyl-dithiophosphatyl - 1,1 - dichloro - 2,2 - dimethylmercaptopropane, dialkyl-dithiophosphatyl - 1,1,3 - trichloro - 2,2 - dimethylmercaptopropane, dialkyl-dithiophosphatyl - 1, 1, 3, 3-tetrachloro-dimethylmercaptopropane, dialkyl-dithiophosphatyl - 1,1,3,3,3 - pentachlorodialkylmercapto-propane, etc., and similarly substituted compounds in which the methylmercapto substituent is replaced by ethylmercapto, propylmercapto, butylmercapto, pentylmercapto, or hexylmercapto, as well as similarly substituted butanes, pentanes, hexanes, etc. Other illustrative examples include 1,3 - bis-(dialkyl-dithiophosphatyl)-1,3 - dichloro - 2,2-dimercaptopropane, 1,3 - bis - (dialkyl-dithiophosphatyl) - 1,4 - dichloro - 2,2 - dimercaptobutane, 1,4-bis-(dialkyl-dithiophosphatyl)-1,4 - dichloro - 2,2 - dimercaptobutane, 1,3 - bis - (dialkyl - dithiophosphatyl) - 1,5 - dichloro - 2,2-dimercaptopentane, 1,4-bis - (dialkyl-dithio-phosphatyl)-1,5-dichloro - 2,2 - dimercaptopentane, 1,5 - bis-(dialkyl-dithiophosphatyl) - 1,5 - dichloro - 2,2 - dimercaptopentane, 1,3 - bis-(dialkyl-dithiophosphatyl) - 1,6 - dichloro-2,2-dimercaptohexane, 1,4-bis-(dialkyl-dithiophosphatyl)-1,6-dichloro-2,2 - dimercaptohexane, 1,5 - bis - (dialkyl-dithiophosphatyl)-1,6 -dichloro - 2,2 - dimercaptohexane, 1,6 - bis - (dialkyl-dithiophosphatyl) - 1,6 - dichloro - 2,2-dimercaptohexane, etc., 1,3 - bis - (dialkyl-dithiophosphatyl) - 1 - chloro - 2,2 - di-mercaptopropane, 1,3 - bis- (dialkyl-dithiophosphatyl) - 1,1 - dichloro - 2,2 - di-mercaptopropane, 1,3 - bis - (dialkyl-dithiophosphatyl) - 1,1, 3-tricholoro - 2,2 - di-mercaptopropane, 1,3-bis-dialkyl-dithio-phosphatyl) - 1,1,3,3 - tetrachloro - 2,2 - di-mercaptopropane, etc., and similarly substituted dithiophosphatyl butanes, pentanes, hexanes, etc.

Here again, the corresponding phosphatyl compounds are readily ascertainable and included in the present invention. In another embodiment only one mercapto substituent is attached to the No. 2 carbon atom and these compounds will correspond to those hereinbefore specifically set forth, except for the single mercapto group.

The ketal derivatives will correspond to the thioketal derivatives hereinbefore set forth, except that the mercapto group will be replaced by an alkoxy group as illustrated for example in compounds as dialkyl-dithiophosphatyl - 1 - chloro-2-methoxy-propane, dialkyl-dithiophosphatyl - 1,1 - dichloro-2-methoxy-propane, dialkyl-dithiophosphatyl - 1,3 - dichloro-2-methoxy-propane, dialkyl-dithiophosphatyl - 1,1,3 - trichloro-2-methoxy-propane, dialkyl-dithiophosphatyl - 1,1,3,3 - tetrachloro-2-methoxypropane, dialkyl - dithiophosphatyl - 1,1,3,3,3 - pentachloro - 2,2-dimethoxypropane, dialkyl-dithiophosphatyl-1,1,3,3,3 - penta-choloro - 2,2 - diethoxypropane, etc., 1,3-bis-(dialkyl-dithiophosphatyl) - 1 - chloro - 2 - methoxy-propane, 1,3 - bis-(dialkyl-dithiophosphatyl) - 1 - chloro-2,2 - dimethoxypropane, 1,3 - bis - (dialkyl-dithiophosphatyl) - 1,1 - dichloro - 2,2 - dimethoxypropane, 1,3-bis-(dialkyl-dithiophosphatyl) - 1,3 - dichloro - 2,2 - dimethoxy-propane, 1,3 - bis-(dialkyl-dithiophosphatyl) - 1,1,3-trichloro - 2,2 - dimethoxy-propane, 1,3 - bis - (dialkyl-dithiophosphatyl) - 1,1,3,3 - tetrachloro - 2,2 -dimethoxypropane, etc., as well as correspondingly substituted dithiophosphatyl butanes, pentanes, hexanes, etc. and the correponding phosphatyl compounds. It is understood that these are illustrative examples and that the alkyl groups will be selected from those hereinbefore specifically set forth and that other modifications within this class of compounds are included within the broad scope of the present invention.

From the hereinbefore description, it will be seen that a large number of novel compounds are comprised within the present invention. It is understood that these different compounds are not necessarily equivalent and that certain compounds will be more effective for certain uses. Also it is understood that a mixture of compounds may be prepared and used in accordance with the present invention. In general, as hereinbefore set forth, the halogen substituted compounds are especially desired for use as insecticides, pesticides, herbicides, rodenticides, etc., and as E.P. additives.

As hereinbefore set forth, the novel compounds of the present invention possess insecticidal properties with good inner-therapeutic action. They may be employed against many types of mites and insects such as, for example, Corausius larvae, Cotoneaster aphid, apple aphid, black bean aphid, aster aphid, green peach aphid, chrysanthemum apid, pea aphid, etc. The compounds or mixtures of these may be used for the control of various larvae, mites, eggs of mites and such insects as flour beetle, Mexican beetle, black carpet beetle, milkweed bug, German cockroaches, southern army worms, mealy bug, sow bug, citrus red spider, greenhouse red spider, various mosquitoes, yellow fever mosquito, malarial mosquito, houseflies, etc.

As hereinbefore set forth the compound of the present invention also is particularly useful as an EP additive in lubricating oil. In lubricating oil the compound also may serve a number of important functions such as oxidation inhibitor (peroxide decomposer), bearing corrosion inhibitor, ring anti-plugging additive, anti-friction additive, detergent etc.

The lubricating oil may be mineral lubricating oil derived from paraffinic, naphthenic, asphaltic or mixed base petroleum crudes or blends thereof and is generally highly refined. In another embodiment the lubricating oil is a synthetic lubricating oil and may be one or a mixture of various types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethyl-hexyl) pimelate, di-(2-ethylhexyl) adipate, triamyl tricarballylate, pentaerythritol tetracaproate, dipropylene glycol dipelargonate, 1,5-pentanediol-di-(2-ethylhexanonate), etc. The polyalkylene oxides and derivatives include polyisopropylene oxide, polyisopropylene oxide diether, polyisopropylene oxide diester, etc. The silicones include methylsilicone, methylphenyl silicone, etc., and the silicates include, for example tetraisooctyl silicate, etc. Synthetic lubricants proposed for use in high temperature service as, for example, jet fuel lubrication, are pentaerythritol esters and trimethylol propane esters.

The novel composition of the present invention also is useful as an additive to lubricating greases. These may be either of synthetic or petroleum origin. The synthetic greases generally are referred to as lithium base grease, sodium base grease, calcium base grease, barium base grease, strontium base grease, aluminum base grease, mixed base greases including barium-calcium base grease, aluminum-calcium base grease, lithium-strontium base grease, etc. These greases are solid or semi-solid gels and, in general, are prepared by the addition to mineral or synthetic lubricating oils of hydrocarbon-soluble metal soaps or salts of higher fatty acids as, for example, lithium stearate, calcium stearate, aluminum naphthenate, etc. The grease may contain stickening agents such as silica, carbon black, polyacrylates, talc, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

The novel composition also is useful in the stabilization of polyolefins and particularly polyethylene. The polyolefins preferably are of high molecular weight, usually having a molecular weight above 1000 and extending into the hundreds of thousand range. Generally these are synthetically prepared. A typical example is the widely used polyethylene plastics. Other polyolefins include polypropenes, polybutenes, and polymers of higher molecular weight olefins. These may be of the high density, medium density or low density type. Polyethylene is utilized, for example, as thermoplastic molding or coating agent. Because of its high dielectric strength and its resistance to water, polyethylene is particularly advantageous for use as insulators or dielectrics in condensers and other similar electronic equipment. However, polyethylene is subject to attack by atmospheric oxygen, particularly at elevated temperatures, either in use or during manufacture, and this impairs the desirable properties thereof including, for example, a reduction in the desirable electric properties, gellation upon oxidation, etc.

Other organic substance which deteriorate in storage, during treatment and/or in use, include hydrocarbons, and particularly motor fuels such as unsaturated gasoline, blends of unsaturated and saturated gasolines, etc., as well as jet fuel, diesel oil, mineral oil, fuel oil, residual oil, drying oil, waxes, resins, rubber, etc. These substances are adversely effected by oxygen, with the resultant formation of one or more of undesirable gum, sediment, discoloration, cracking, corrosion, and/or other deleterious reactions.

When used as an additive to organic substrates, the novel compounds of the present invention may be utilized in a concentration of from about 0.001% to about 25% by weight of the organic substrate, although in some cases higher or lower concentrations may be employed. The exact concentration to be used will depend upon the particular substrate to be treated. In most cases concentrations from about 0.01% to about 5% by weight generally will be employed.

It is understood that the composition of the present invention may be used along with other additives incorporated in the organic substrate. For example, one or more of an additional additive including metal deactivator, dye, viscosity index improver, pour point depressant, anti-foaming additive, lubricity and extreme pressure additive, anti-scuffing additive, detergent, corrosion inhibitor, etc., may be incorporated in the substrate. When desired, the composition of the present invention may be prepared as a mixture with one or more of these other additives and marketed and/or incorporated in the substrate in this manner.

The composition of the present invention may be incorporated in the organic substrate in any suitable manner and at any suitable stage of preparation. When incorporated in a liquid substrate, the composition of matter is added thereto and intimately mixed by conventional means. When added to a solid or semi-solid substrate, the composition of the present invention preferably is added during the manufacture thereof in order to obtain intimate mixing. For example, in the manufacture of grease, the composition of the present invention may be added to one or more of the components of the grease prior to compositing and processing thereof, or it may be added to the mix at any time, preferably before final processing in order to obtain intimate mixing and dissolving thereof in the grease. In other cases, a solid substrate may be dipped, soaked, or immersed in the additive, or the latter may be sprayed, brushed or otherwise applied to the solid substrate.

The following examples are introduced to illustrate further the novelty and utility of the present invention but not with the intention of unduly limiting the same.

EXAMPLE I 1,3-bis-(dithiophosphatyl)-1,3-dichloro-propanone-2 is prepared by reacting 2 mole proportions of the sodium salt of dithiophosphoric acid with 1 mole proportion of 1,1,3,3,-tetrachloroacetone under refluxing conditions in the presence of isopropanol solvent. Following completion of the reaction, the reaction mixture is dissolved in benzene, filtered, washed, dried and distilled under vacuum.

EXAMPLE II 1,3 - bis - (O,O - dimethyl - dithiophosphatyl) - 1,1,3,3-tetrachloro-propanone-2 is prepared by reacting 2 mole proportions of the sodium salt of O,O-dimethyl-dithiophosphate with 1 mole proportion of hexachloroacetone under refluxing conditions in the presence of isopropanol solvent. After the reaction is completed, the reaction mixture is dissolved in benzene, filtered, washed, dried and distilled under vacuum.

EXAMPLE III

Diisopropylphosphatyl-1,3-dichloroacetone is prepared by reacting equal mole proportions of potassium diisopropylphosphate and 1,1,3-trichloropropanone-2, The reaction is effected by first dissolving the potassium diisopropyl phosphate in methanol and subjecting the mixture to refluxing. The trichloropropanone-2 is added dropwise to the refluxing mixture. Following completion of the reaction the reaction mixture is filtered to remove potassium chloride and then is washed with hot acetone-methanol. The product then is washed with water, dried, filtered, and heated on a steam bath to remove lighter materials.

EXAMPLE IV

The compound of this example is 1,3-bis-(O,O-dioctylphosphatyl)-1,1,3,3,-tetrachloroacetone and is prepared by reaction two mole proportions of sodium dioctylphosphate and one mole proportion of 1,1,1,3,3,3-hexachloropropanone-2. The reaction is effected in the manner hereinbefore set forth and the product is dissolved in benzene, washed, dried, filtered and heated on a steam bath under vacuum to remove benzene and lighter materials.

EXAMPLE V

The thioketal derivative of 1,3-bis-(dithiophosphatyl)-1,3-dichloropropanone-2, prepared as described in Example I, is prepared by reacting one mole proportion of 1,3-bis-(dithiophosphatyl) - 1,3-dichloropropanone-2 with two mole proportions plus 10% excess of ethyl mercaptan in the presence of anhydrous hydrogen chloride. The reactants are commingled at room temperature and results in an exothermic reaction. Additional ethyl mercaptan is added, with intimate stirring, to replace the loss due to evaporation. Following completion of the reaction, the product is dried, filtered and distilled under vacuum on a steam bath.

EXAMPLE VI

The ketal derivative of 1,3-bis-(O,O-dimethyl-dithiophosphatyl)-1,1,3,3-tetrachloropropanone-2 is prepared by reacting one mole thereof with two mole proportions of ethyl alcohol in substantially the same manner as described in Example V. Following completion of the reaction, the product is washed, dried and heated under vacuum to remove lighter materials.

EXAMPLE VII

As hereinbefore set forth, the chlorine-containing dithiophosphatyl ketone is useful as an insecticide. An insecticidal composition is prepared by dissolving 1 g. of 1,3-bis-(dithiophosphatyl)-1,3-dichloro-propanone-2, prepared as described in Example I, in 2 cc. of benzene and emulsifying the resultant solution with 100 cc. of water using Triton X–100 as the emulsifying agent. The resulting emulsion is sprayed into a cage containing houseflies and results in greater than 98% knockdown.

EXAMPLE VIII 1,3 - bis - (O,O - dioctylphosphatyl) - 1,1,3,3 - tetrachloroacetone, prepared as described in Example IV, is used as an additive in lubricating oil. The additive is incorporated in the lubricating oil in a concentration of 1% by weight thereof, and serves to improve the E.P. properties of the lubricating oil.

I claim as my invention:
1. Alpha-substituted phosphatyl or thiophosphatyl ke- tal or thioketal derivatives thereof, represented by the following formula:

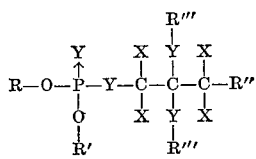

when O is oxygen, P is phosphorus, C is carbon, X is halo or hydrogen, at least one X being halogen, Y is sulfur or oxygen, R and R' are halogen, alkyl of from 1 to 20 carbon atoms, cyclopentyl, cyclohexyl, phenyl, naphthyl, or alkylphenyl, alkylnaphthyl, phenylalkyl or naphthylalkyl in which the alkyl contains from 1 to 20 carbon atoms, R''' is alkyl of from 1 to 6 carbon atoms or one of the abovementioned cyclic hydrocarbon radicals, and R'' is hydrogen, halogen, alkyl of from 1 to 6 carbon atoms, one of the abovementioned cyclic hydrocarbon radicals or

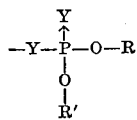

2. A compound as defined in claim 1 further characterized in that R and R' are alkyl of from 1 to 20 carbon atoms and R'' and R''' are alkyl of from 1 to 6 carbon atoms.

3. The compound of claim 1 being the thioketal derivative of dialkyl-dithiophosphatyl chloroacetone.

4. The compound of claim 1 being 1,3-bis-(dialkyldithiophosphatyl)-1,3-dichloro-2,2-diethylmercaptopropane.

5. The compound of claim 1 being 1,3-bis-(dialkyldithiophosphatyl)-1,3-dichloro-2,2-dimethoxypropane.

6. The compound of claim 3 being diisopropyldithiophosphatyl-1,3-dichloro-2,2-diethylmercaptopropane.

References Cited

UNITED STATES PATENTS

| | | | |
|---|---|---|---|
| 2,928,862 | 3/1960 | Willard et al. | 260—928 XR |
| 3,028,303 | 4/1962 | Chupp | 260—928 XR |
| 3,105,003 | 9/1963 | Walsh et al. | 260—929 XR |

CHARLES B. PARKER, *Primary Examiner.*

A. H. SUTTO, *Assistant Examiner.*